United States Patent
Moncomble et al.

(10) Patent No.: US 12,358,427 B2
(45) Date of Patent: Jul. 15, 2025

(54) METHOD FOR ALERTING A DRIVER OF AN AUTOMOBILE VEHICLE AFTER DETERMINING AREAS NOT BEING MONITORED BY THE DRIVER

(71) Applicant: ORANGE, Issy-les-Moulineaux (FR)

(72) Inventors: Ghislain Moncomble, Chatillon (FR); Michel Puharre, Chatillon (FR); Mathieu Lefebvre, Chatillon (FR)

(73) Assignee: ORANGE, Issy-les-Moulineaux (FR)

(*) Notice: Subject to any disclaimer, the term of this patent is extended or adjusted under 35 U.S.C. 154(b) by 18 days.

(21) Appl. No.: 18/337,698

(22) Filed: Jun. 20, 2023

(65) Prior Publication Data
US 2023/0406204 A1 Dec. 21, 2023

(30) Foreign Application Priority Data
Jun. 21, 2022 (FR) ...................................... 2206066

(51) Int. Cl.
*G08B 21/00* (2006.01)
*B60Q 9/00* (2006.01)
*G08G 1/0967* (2006.01)

(52) U.S. Cl.
CPC ............. *B60Q 9/00* (2013.01); *G08G 1/0967* (2013.01)

(58) Field of Classification Search
USPC ... 340/425.5, 5.1–5.33, 5.61, 5.8, 5.81, 427, 340/429, 438, 435, 461, 488, 539.13, 340/539.22
See application file for complete search history.

(56) References Cited

U.S. PATENT DOCUMENTS

| | | | |
|---|---|---|---|
| 7,093,693 B1* | 8/2006 | Gazdzinski | B66B 3/00 340/5.2 |
| 9,975,483 B1 | 5/2018 | Ramaswamy | |
| 2006/0190124 A1* | 8/2006 | Makela | G05D 1/028 700/213 |
| 2010/0217669 A1* | 8/2010 | Gazdzinski | G06F 3/044 345/173 |
| 2011/0169625 A1 | 7/2011 | James et al. | |
| 2016/0355199 A1* | 12/2016 | Kernwein | B61L 15/0027 |
| 2017/0022807 A1* | 1/2017 | Dursun | E21B 49/08 |
| 2018/0367617 A1* | 12/2018 | Moustafa | H04L 69/08 |
| 2020/0239071 A1* | 7/2020 | Lenneman | B62D 15/029 |
| 2020/0250982 A1 | 8/2020 | Kim et al. | |
| 2021/0053586 A1* | 2/2021 | Domeyer | B60W 60/00 |
| 2021/0245775 A1* | 8/2021 | Subramanian | B60W 50/14 |
| 2022/0088787 A1* | 3/2022 | Vu | B25J 9/1694 |
| 2022/0118997 A1* | 4/2022 | Paus | H04R 1/323 |
| 2022/0121867 A1 | 4/2022 | Arar et al. | |

OTHER PUBLICATIONS

French Search Report and Written Opinion dated Feb. 9, 2023 for corresponding French Application No. 2206066, filed Jun. 21, 2022.

* cited by examiner

*Primary Examiner* — Daniel Previl
(74) *Attorney, Agent, or Firm* — David D. Brush; Westman, Champlin & Koehler, P.A.

(57) ABSTRACT

A method for alerting a driver of an automobile vehicle. The method includes: obtaining an area not being monitored by the driver and activating sensors of the vehicle relating to the unmonitored area; analyzing data captured by the sensors relating to the unmonitored area in order to detect an event to come; and rendering or not to the driver information representative of an alert depending on the result of the analysis.

9 Claims, 2 Drawing Sheets

METHOD FOR ALERTING A DRIVER OF AN AUTOMOBILE VEHICLE AFTER DETERMINING AREAS NOT BEING MONITORED BY THE DRIVER

TECHNICAL FIELD

The technical field is that of automobile driving assistance.

More precisely, an aspect of the present disclosure relates to a method for alerting a driver of an automobile vehicle after determining areas not being monitored by the driver. The driver in question is indeed a human driver in charge of driving the automobile vehicle at the time of the execution of the method. If the automobile vehicle in question is an autonomous vehicle, or remotely controlled, which is therefore in general driven without intervention of a passenger inside of the vehicle, the method will only be applicable when the autonomous driving mode is disabled, and hence when the automobile vehicle is being driven by a human driver.

PRIOR ART

The field of automobile driving is on the verge of significant upheaval as a result of the recent technical progress. The most noteworthy is the development of autonomous driving. The expected progress in the field of autonomous driving promises to significantly improve road safety by ensuring that human driving errors will be eliminated.

For example, there exists an extensive prior art on devices and methods allowing potential hazards for a vehicle to be automatically detected. These devices and methods firstly rely on the establishment of driving scenarios which allow the dangerous situations that may arise to be categorized according to the situation of the vehicle. Thus, the detection by an autonomous vehicle that it is approaching a road junction where it must stop and give way ("stop" junction) allows possible accident scenarios at this type of junction to be selected. The autonomous vehicle will then use all of its sensors (cameras in several directions, but also potentially radar and/or lidar detectors) in order to try and detect potential hazards depending on its situation and on the possible accident scenarios according to its situation. The autonomous vehicle will also be able to use, if it is connected to a communications network, complementary information which would be transmitted to it either by other connected vehicles, or by road regulation or supervision services. The detection by the sensors of the autonomous vehicle, potentially completed by other sources of information, of a real danger may then trigger a whole series of actions on the driving mechanisms of the autonomous vehicle, namely the steering, the brakes or the acceleration, in order to allow the real danger to be avoided and for it not to result in an accident.

Another example of capacity for autonomous driving is that of the detection that the vehicle is going to cross a line marked on the road that it is not supposed to cross, such as a continuous line, or else a line indicating the verge. The alert detected may then trigger an intervention on a driving mechanism, namely the steering, in order to avoid this dangerous line crossing.

However, the transition toward the generalization of the autonomous automobile will take time and will be implemented in stages. Levels of autonomy have been defined and are used for qualifying the vehicles being developed. The level 5 corresponds to totally autonomous vehicles, whereas the level 1 corresponds to vehicles whose level of autonomy is very limited, and comprises for example reversing radar systems and possibilities of autonomous parking in reverse gear. The level 0 corresponds to the vehicles lacking capacities for autonomous driving. In 2022, prototypes of autonomous vehicles of level 4 are in the process of being certified by two automobile manufacturers, namely Mercedes-Benz and Tesla. The level 4 corresponds to vehicles which could take control of the driving on roads duly identified, such as freeways.

The existing fleet of automobile vehicles, not designed for autonomous driving, is therefore very large and will remain the vast majority in the near term, with the knowledge that no autonomous vehicle of level 5 (hence entirely autonomous) is planned until 2025 at the earliest. Hence, human drivers are, and will remain, the vast majority for a long period of time. Moreover, the integration of the driving mechanisms (steering, acceleration, brakes) with a decision mechanism of a vehicle not designed for this, in other words trying to make possible an autonomous action on the driving of the vehicle, is a very costly operation. The devices and methods for autonomous driving, or else the transformation of the current vehicles into autonomous vehicles, are not therefore an immediate answer and at a reasonable cost for improving road safety.

Devices and methods are therefore currently trying to improve the safety of the driving of automobile vehicles. In particular, methods and devices for detecting the attention of drivers are found in the prior art. These methods and devices allow a state of drowsiness of the driver to be detected and an alert to be triggered if this is the case. These methods and devices of the prior art rely on several techniques, such as the analysis of the blinking of the driver, or else the analysis of his/her frequency of yawning, or even the analysis of the position of the head of the driver.

Such a method allows an alert to be generated when faced with a potential danger, namely the loss of attention of the driver.

Other methods, not currently applied to the field of automobile driving, have also been studied in order to determine the monitoring area of a user, namely the area he/she is monitoring.

There accordingly exists a need for methods and devices for improving road safety which may be adapted at low cost on the non-autonomous vehicles of the current fleet and which are applicable to real dangers, at imminent risk of materializing, and not only to potential hazards.

One or more aspects of the present disclosure are aimed at improving the situation.

SUMMARY

According to a first functional aspect, the disclosure relates to a method for alerting the driver of an automobile vehicle, characterized in that it comprises the following steps:
  A step for obtaining an area not being monitored by the driver and for activating sensors of the vehicle relating to the unmonitored area;
  A step for analyzing data captured by the sensors relating to said unmonitored area in order to detect an event to come;
  A step for rendering or not to the driver of information representative of an alert depending on the result of the analysis step.

By virtue of an aspect of the disclosure, the driver of the vehicle is alerted of an imminent event if it has been analyzed that the latter will occur in an area which has not been monitored by the driver. As a variant, according to the information representative of an alert which is rendered to him/her, the driver may simply be informed that there is no danger coming from the areas that he/she is not monitoring. In this way, the data fed back by sensors situated around the vehicle are used in a relevant manner, without having to be processed by a full autonomous driving system. The method may therefore be used in automobile vehicles of the current generation, without expecting to switch into the use for autonomous vehicles. The improvement brought to road safety by the method is therefore immediate and at low cost because it does not require the renewal of the automobile fleet, but simply the provision of sensors which may be added to existing vehicles.

In certain embodiments, the method comprises a step for determining an area, referred to as monitoring area, that the driver monitors. The obtaining of the unmonitored area will then be achieved by assuming that the unmonitored area is complementary to the monitored area. Other embodiments do not determine a monitoring area. For example, the method may consider that, by default, all the areas around the vehicle are unmonitored, and the observation of the driver will remove locations from the unmonitored area without determining precisely a monitoring area. In this embodiment, the observation that the driver is focusing his/her gaze at one location will remove this location from the unmonitored area for a given period of time. This location will return to the unmonitored area at the expiration of this period of time if the driver has not returned his/her gaze to this location.

It should be noted that the three steps of the method, or four in the embodiments which comprise a step for determining the monitoring area, are carried out successively but may be repeated in a continuous loop throughout the driving period, a loop during which the method will continuously determine the area or areas not being monitored by the driver; based on this information constantly received, analyze the relevant data and, if necessary, trigger one or more alerts or just render or not information to the driver.

Activating sensors relating to an unmonitored area offers several advantages. Firstly, this activation allows it to be guaranteed that alerts fed back by the activated sensors occur in an area not being monitored by the driver. In this way, the driver will not be inconvenienced by unnecessary alerts. Another advantage is the economy of resources and of energy consumption. The sensors are only activated in order to compensate a non-monitoring by the driver and hence are only activated for the minimum time.

Again, according to a first particular embodiment of the disclosure, the events detected are categorized and information representative of an alert is rendered in the case where an event is imminent depending on its category.

By virtue of this first embodiment, the method will rely on predefined scenarios of road traffic events in order to determine whether events detected by the sensors in the unmonitored area effectively warrant information representative of an alert being rendered, or more simply an alert being triggered or not depending on the imminence of a categorized event. For example, an object may arrive at a road junction toward the automobile vehicle in the area not being monitored by the driver and, depending on the nature of the object and the nature of the junction, an alert could be triggered. In this way, the method is limited to the relevant alerts. The method may, on the contrary, indicate that there is no alert coming from unmonitored areas.

According to a second particular embodiment of the disclosure, the automobile vehicle is connected to a communications network, and the method comprises an additional step for transmission of information representative of an alert via the communications network to connected vehicles concerned by the event.

In this second embodiment, the vehicle concerned by the method for alerting the driver is connected to a communications network. In this way, the method allows the alert to be broadcast beyond the vehicle initially concerned. The method may use a broadcast from one to another which will address the information representative of the alert to nearby vehicles via one of the direct means of communication V2X (acronym for the expression vehicle to everything), said nearby vehicles being potentially concerned by the alert, or else may use a transmission to a central supervising server which will subsequently relay the information representative of the alert to connected vehicles that the server is supervising and that it determines to potentially be concerned.

According to a third particular embodiment of the disclosure, which could be implemented alternatively or cumulatively with the preceding embodiments, the method comprises a step for determining an area referred to as monitoring area, that the driver is monitoring, and the information rendered consists of a stimulus in the monitoring area indicating to the driver an alert or an absence of alert coming from the unmonitored area obtained.

By virtue of this embodiment, in which a monitoring area is effectively determined, the information is rendered to the driver directly in the area referred to as monitoring area, namely that which he/she is monitoring. In this way, the driver will be able to react in an appropriate way to the information rendered without having to direct his/her attention onto a different area. In this way, the reaction time of the driver is the shortest possible. The driver will be able to react to the information rendered by applying a driving action, for example by braking, even without changing the direction of his/her attention.

The stimulus might not contain an alert. The information rendered in this case to the driver will then allow him/her to be aware that there is an area that he/she is not monitoring, which is relevant information in itself, and also that there is no imminent event to be expected coming from this unmonitored area. This embodiment may allow a continuous monitoring of a given area to be effected by an automatic means. The driver will then be aware that a given area does not have to be monitored by him/herself, but that, if an event of a particular category is going to occur imminently in the unmonitored area, he/she will then be alerted.

According to a fourth particular embodiment of the disclosure, which could be implemented alternatively or cumulatively with the preceding embodiments, the information rendered consists of a stimulus attracting the attention of the driver to the unmonitored area obtained.

By virtue of this particular embodiment of the disclosure, the alert will allow the driver to react in an appropriate manner to the event detected by diverting his/her attention to the unmonitored area. The driver will then react and his/her action on the driving systems will allow the chances of avoiding the imminent danger to be increased. In this way, an effect is obtained similar to the accident avoidance systems provided in autonomous vehicles without having to introduce a direct integration of a decision system with the driving mechanisms of the car. Such a direct integration will not be possible for a long time in view of the current fleet of automobile vehicles and would be very expensive for the users, purchasers and drivers of automobile vehicles.

According to a fifth particular embodiment of the disclosure, which could be implemented cumulatively with the preceding embodiments, the obtaining of an unmonitored area takes into account the attention level of the driver, in such a manner that the lower the attention level, the larger the unmonitored area obtained.

By virtue of this embodiment, the method uses information which is now widely accessible, namely an estimation of the attention level of the driver, so as to refine the alerts potentially triggered by the method by bounding more precisely the area not being monitored by the driver.

In embodiments, this embodiment will use the determination of a monitoring area, and the lower the attention level of the driver, the smaller will be the monitoring area determined and, in a complementary manner, the larger will be the unmonitored area. One embodiment may consider that the angle of view of the driver decreases with the attention level. For a direction observed by the gaze of the driver, if the attention level decreases, then the angle of view also decreases, and the monitoring area determined also decreases.

In embodiments, this embodiment is directly applicable for obtaining an unmonitored area. One embodiment may consider that, when the attention level of the driver decreases, an area will be deemed as unmonitored starting from a short time since the last time that the driver cast his/her gaze on this area.

According to one particular embodiment of the disclosure, the determination of a monitoring area takes into account the attention level of the driver, in such a manner that the lower the attention level, the smaller the monitoring area determined.

According to a sixth particular embodiment of the disclosure, which could be implemented cumulatively with the preceding embodiments, the rendering of information representative of an alert to the driver takes into account the attention level of the driver, in such a manner that the lower the attention level, the earlier the representative information is rendered.

By virtue of this embodiment, the method takes into account the reaction time of the driver, which is decreased when his/her attention is lowered, in the process of rendering information representative of the alert.

According to a first hardware aspect, the disclosure relates to a management entity managing a method for alerting the driver of an automobile vehicle, characterized in that it comprises the following modules:
  A module for obtaining an area not being monitored by the driver and for activating sensors of the vehicle relating to the unmonitored area;
  A module for analyzing data captured by the sensors relating to the unmonitored area in order to detect a given event;
  A module for rendering information representative of an alert if an event is detected by the analysis module.

According to a second hardware aspect, the disclosure relates to a device comprising the management entity mentioned hereinabove.

The device could advantageously for example be carried onboard an automobile vehicle.

According to another hardware aspect, the disclosure relates to a computer program able to be implemented by a management entity, the program comprising code instructions which, when it is executed by a processor, perform the steps of the alerting method defined hereinabove.

Lastly, according to another hardware aspect, the disclosure relates to a data medium on which a computer program is recorded comprising a sequence of instructions for the implementation of the alerting method defined hereinabove when it is loaded into and executed by a processor.

The data media may be any given entity or device capable of storing the programs. For example, the media may comprise a storage means, such as a ROM, for example a CD ROM or a microelectronic circuit ROM, or else a magnetic recording means such as a hard disk. Furthermore, the media may be transmissible media such as an electrical or optical signal, which may be carried via an electrical or optical cable, by radio or by other means. The programs according to one or more aspects of the disclosure may in particular be uploaded onto a network of the Internet type. Alternatively, the information medium may be an integrated circuit in which the program is incorporated, the circuit being designed to execute or to be used in the execution of the method in question.

BRIEF DESCRIPTION OF THE DRAWINGS

One or more aspects of the disclosure will be better understood upon reading the description that follows, given by way of example, and with reference to the appended drawings in which.

DETAILED DESCRIPTION OF ILLUSTRATIVE EMBODIMENTS

Figure 1:
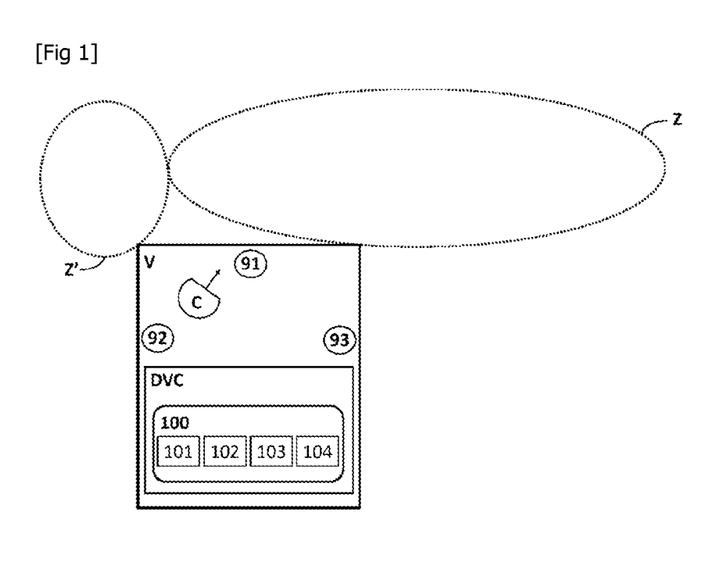
FIG. 1 shows an automobile vehicle comprising a device including a management entity according to an aspect of the disclosure, together with a driver and areas being monitored and not being monitored by the driver.

FIG. 1 shows an automobile vehicle V.

The latter has an onboard device DVC which itself comprises a management entity 100. The management entity 100 is composed of four modules 101, 102, 103 and 104. The vehicle V furthermore comprises sensors 91, 92 and 93. The driver C of the automobile vehicle V is also shown. The arrow indicates the direction of his/her gaze at a given moment in time.

The automobile vehicle V will most often be a personal car. However, one or more aspects of the disclosure may also be applied to other vehicles, such as a bus, a van or a truck. Generally speaking, an aspect of the disclosure will be more applicable to an automobile vehicle V which has a compartment for its driver C, certain embodiments of the disclosure being applicable to road vehicles with no compartment such as motorbikes. Similarly, in certain embodiments of the disclosure, the vehicle V will not be an automobile vehicle but could be a ship or a railroad vehicle or even an airplane.

One important point is that the automobile vehicle V does not have capacities for autonomous driving of high levels, namely there is no direct link between a processing mechanism such as the device DVC or the management entity 100 and the driving mechanisms of the vehicle V such as the steering, the acceleration or the braking system. These capacities may, in certain cases, be present in the vehicle V but not be activated, which currently is frequently the case; or else all or part of these capacities may be present but not cover all of the uses covered by the present application. For example, the capacities for autonomous driving present in the vehicle V are limited to particular cases such as reversing or automatic parking assistance. Any driving action of the automobile vehicle V will necessarily be carried out by the driver C, or in any event the driving actions corresponding to all or part of the scenarios covered by the present application. Accordingly, as a consequence in such cases, a driving action aimed at avoiding an imminent danger will also need to be carried out by the driver C him/herself.

It should be noted that the addition of capacities for autonomous driving to a vehicle V not having them is possible but at a very high cost. Indeed, the integration of a driving mechanism not provided for that purpose with a decision mechanism is not readily achieved.

On the other hand, it is now common for an automobile vehicle V, even lacking capacities for autonomous driving, to be equipped with sensors 91, 92 and 93 as shown in FIG. 1. These sensors 91, 92, 93 may be cameras, but also, in more sophisticated versions, radar or lidar sensors. It may also be envisioned to use sound sensors (microphone). However, cameras are especially used as they offer the best quality-price ratio in terms of capacity for monitoring events at a low cost. The use of cameras as sensors 91, 92, 93 has therefore become generalized even on mid-range automobile vehicles, used for example for monitoring the rear of a vehicle V in the case of reversing, or for autonomous vehicles of level 1 or 2.

The automobile vehicle V has an onboard device DVC. The latter has the hardware architecture of a conventional computer. It notably comprises a processor, a volatile memory of the RAM type and a non-volatile memory such as a memory of the Flash, ROM type (not shown in the figure). The device DVC may for example be the onboard computer of the vehicle V which furthermore fulfils navigation or multimedia center functions. In this case, the device DVC will be connected to all of the sensors 91, 92, 93 of the vehicle V and will be able to acquire the data captured by the sensors 91, 92, 93 when the alerting method is implemented by the management entity 100. The device DVC may also be an independent unit of equipment of the automobile vehicle V, purchased separately from the latter. In this case, the device DVC may be delivered with a set of sensors 91, 92, 93 that will be available to the user in order to make possible the implementation of the alerting method by the management entity 100. It was previously mentioned that the cost of the sensors 91, 92, 93 such as cameras was now low enough to be sold as a kit with a device DVC at a reasonable price.

In one embodiment, the device DVC may be a smartphone, for example that of the driver C. The management entity 100 may then be a dedicated application, downloaded by the driver C onto the device DVC. In this embodiment, the smartphone will need to be able to connect with sensors 91, 92, 93 already present in the vehicle V, or else the user will need to purchase sensors 91, 92, 93 and to connect the device DVC, which is a smartphone, to the sensors 91, 92, 93 so that the management entity 100, which is an application, can implement the alerting method.

The connection between the device DVC and the sensors 91, 92, 93 may for example be a wired connection, when the device DVC and the sensors 91, 92, 93 are integrated as original into the vehicle V. However, in the embodiments in which the device DVC or else the sensors 91, 92, 93 are, partially or entirely, added by the user to the vehicle V, a wireless link such as a Bluetooth or WiFi or other connection could be used to advantage.

The device DVC comprises a management entity 100 which will implement the alerting method according to an aspect of the disclosure. In the present exemplary embodiment shown in FIG. 1, the management entity 100 comprises modules 101, 102, 103 and 104. It should be noted here that, in the present text, the term "module" may just as easily correspond to a software component as to a hardware component or a set of hardware and software components, a software component itself corresponding to one or more computer programs or sub-programs or, more generally, to any element of a program capable of implementing a function or a set of functions such as described for the modules concerned. In the same way, a hardware component corresponds to any element of a hardware assembly capable of implementing a function or a set of functions for the module concerned (integrated circuit, smartcard, memory cards, etc.).

The modules 101, 102, 103 and 104 of the present example will implement successive steps S1, S2, S3 and S4 of the alerting method giving rise to an aspect of the disclosure.

In the present example, the determination module 101 implements the step S1 for determining a monitoring area Z that the driver C is monitoring. For this purpose, the determination module 101 must have at its disposal data fed back by one or more sensors from amongst the sensors 91, 92, 93 which is oriented toward the driver C. This or these sensors from amongst the sensors 91, 92, 93 oriented toward the driver C will feed back to the module 101 data relating to the face of the driver C. Most often, the sensor used from amongst the sensors 91, 92, 93 will be a camera and the data captured by the latter are images. Conventionally, image-processing algorithms then allow the module 101 to perform several processing operations which will allow for example at least one eye of the driver C to be identified. This subsequently allows the determination module 101 to determine the direction of the gaze of the driver C, shown in FIG. 1 by an arrow. At a given moment in time, it allows a monitored area Z to be determined during the step S1.

This direction of the gaze of the driver C will of course vary over time. When the gaze of the driver C leaves one area, this area which the gaze of the driver C has just left will remain in the monitored area Z such as determined at the step S1 by the determination module 101 for a certain time which will depend on several conditions.

One example of these conditions may be the nature of the road where the vehicle V is located and that the driver C is monitoring. On a high-speed road, the monitoring of an area Z by the driver C will quickly be obsolete, and it will therefore have to be quickly renewed by the gaze of the driver C in order for the area Z to indeed be a monitoring area that the driver C is monitoring. On the contrary, in a low-speed traffic situation, the gaze of the driver C will mean that the area Z will be considered as monitoring area for a longer period of time.

The conditions of the environment, such as weather conditions (presence of fog or of rain), time of day conditions (is it daytime or nighttime?), lighting conditions, may also be used. Indeed, depending on the visibility distance that the driver C has, his/her gaze will mean that the area Z will be considered as monitoring area for a longer or shorter period of time, and the driver C will need to renew more frequently his/her attention on an area Z so that it is indeed a monitoring area Z as determined by the step S1.

In one embodiment, the data from the sensor amongst the sensors 91, 92, 93 which are used to determine the direction of the gaze of the driver C are also used to determine the attention level of the driver C.

Determining the attention level of the driver C is an action well known in the prior art. Several approaches exist, which use mainly an analysis of images of the eyes of the driver C.

In particular, the approaches analyze the frequency of blinking of the eyes, together with the changes apparent on the movement of the eyelids, in the approach referred to as PERCLOS. This analysis of the movement of the eyelids allows information on the duration of closing of the eyes of the driver C during blinking to be added to the information on the frequency of blinking, and hence an estimation of the heaviness of the eyelids of the driver C. Other analyses are based on a calculation of the frequency of yawning and an estimation of the position of the head. The data which allows the module 101 to implement the step S1 for determining a monitoring area that the driver C is monitoring, which are in general images of the face of the driver C, may therefore be used for these analyses of calculation of the frequency of yawning and of estimation of the position of the head of the driver C.

Once the attention level of the driver C is determined, this datum may be used in one embodiment of the determination step S1 by the module 101 for refining the determination of the monitoring area Z that the driver C is monitoring. The attention level of the driver C is then an additional condition which influences the period of time for which an area will be determined as monitoring area Z after the gaze of the driver C has left the area in question, and also the period of time for which the driver C has to be looking at an area for it to be considered as monitoring area Z.

In this embodiment, the attention threshold of the driver C is used as the other conditions for varying the time which is judged sufficient for the fact that the driver C has turned his/her gaze toward an area suffices for this area to be considered as monitoring area Z. In other words, when the attention level of the driver C is high, the area onto which the gaze of the driver C is turned will be considered as monitoring area Z for quite a long time after the driver C has diverted his/her gaze elsewhere. Moreover, when the attention level of the driver C is high, it suffices for the driver C to turn his/her gaze toward a given area for a short period of time for this area to be considered as monitoring area Z.

These two relationships are of course reversed when the attention level of the driver C is determined as being low.

Aside from taking into account the monitoring times, the attention level also allows the surface area of said monitoring area Z to be refined. Indeed, it has been demonstrated in the prior art that a lowering of alertness is correlated with a reduction in the angle of view being monitored, hence in the surface area of the monitoring area Z.

In other words, in this embodiment, the lower the attention level of the driver C, the smaller the monitoring area Z determined by the module 101 during the step S1.

It is also important to note that the step S1 for determining a monitoring area Z that the driver C is monitoring is not only based on the direction that the gaze of the driver C adopts, but also takes into account the presence of third-party monitoring devices of the vehicle, such as, as a non-exhaustive example, rear-view mirrors inside of the compartment of the vehicle V or outside of this compartment, or else a display on the dashboard of images or of an equivalent representation coming from cameras positioned as a non-exhaustive example at the rear of the vehicle.

The monitoring area Z may therefore comprise areas situated at the rear of the vehicle V when the gaze of the driver C turns to one or more of these devices, such as a rear-view mirror for example. Here again, the conditions of the environment or of attention of the driver C will have an influence on the time that the gaze of the driver C has to be focused on the rear-view mirror or mirrors so that the area concerned is included in the monitoring area Z, together with the period of time during which a gaze on a rear-view mirror means that a given area will be considered as a monitoring area Z.

The acquisition module 102 implements the step S2 for obtaining an area Z' not monitored by the driver C.

This acquisition step S2 may be based on the monitoring area Z which has been determined during the step S1. For example, the unmonitored area Z' is the complementary area of the monitoring area Z that the driver C is monitoring determined at the step S1. In other examples, obtaining the unmonitored area Z' is achieved without determining a monitoring area Z. For example, the method may consider that all of the areas around the vehicle form part of the unmonitored area Z' and the latter is reduced when the sensors 91, 92, 93 observe that the driver C turns his/her gaze in a given direction. The environmental conditions and the attention level of the driver C may then be used, and in particular in such a manner that the lower the attention level of the driver, the larger the unmonitored area Z'. This relationship may be obtained by considering that the gaze of the driver C, when the driver C has a low attention level, must be more frequently focused on a given location in order to remove this location from the unmonitored area Z'. This relation may also be obtained by considering that, when the driver C has a low attention level, the gaze of the driver C allows a given more limited location to be removed from the unmonitored area Z', because the angle of view of the driver C is narrower when his/her attention level is low. In any case, it is possible to use the environmental conditions or those relating to the attention of the driver C, or the two categories of conditions in combination, in order to refine the step S2 for obtaining the unmonitored area Z', in an inverse manner to that for which these conditions would be used for determining the monitoring area Z.

In certain embodiments, the unmonitored area Z' is not exactly the complement of a monitored area Z. For example, the unmonitored area Z' may be obtained by taking into account road safety constraints which mean that, even if the observation of the driver indicates that he/she is monitoring a given location, this location will be considered as forming part of the unmonitored area Z' in order to ensure that the sensors covering this location will indeed be activated in order to try and detect potentially dangerous events occurring at this location.

The extent of said unmonitored area Z' may also depend on scenarios or cases of use in which the vehicle V is positioned or will be positioned depending on its path of travel and on its speed. For example, the potential monitoring areas Z of a vehicle V traveling on a highway will be the front, the rear and potentially the left of the vehicle if a third-party vehicle is in the process of overtaking said vehicle A.

In which case, if the monitoring area Z determined at the step S1 corresponds to the front and to the left of the vehicle V, the area to be monitored Z' will correspond to the rear of the vehicle V.

According to another example, the potential monitoring areas Z of a vehicle V stopped at a junction will be the front, the rear, the right and the left of the vehicle V. In which case, if the monitoring area Z determined at the step S1 corresponds to the right and the front of the vehicle V, the unmonitored area Z' will correspond to the rear and the left of the vehicle V.

Once the unmonitored area Z' has been obtained, the acquisition module 102 will activate, if necessary, sensors 91, 92, 93 relating to the unmonitored area Z'. It is possible for the sensors 91, 92, 93 to be activated continuously. The objective here is of course to obtain data relating to the events that may occur in the unmonitored area Z' and which may therefore escape the attention of the driver C. The sensors 91, 92, 93 may be cameras, which are available at a reduced cost, but also radar or lidar sensors, or even sound sensors in certain embodiments. The sensors 91, 92, 93 may be integrated into the vehicle V during its manufacture or else have been added at a later date, for example when a device DVC initially not provided in the vehicle V is installed.

In the case where said vehicle V is connected, the data captured may furthermore be complemented by data communicated by other nearby vehicles via one of the means of direct communication V2X (acronym for vehicle to everything) or else by a central supervising server relaying various data to the vehicles within a given perimeter. The device DVC may thus include a means allowing all or part of the data received by the vehicle to be acquired and interpreted.

The data analysis module 103 implements the step S3 for analyzing data captured by the sensors 91, 92, 93 relating to the unmonitored area Z'.

The module 103 will use well-known image-processing algorithms in the case where the sensors 91, 92, 93 are cameras, and more generally, signal-processing algorithms for analyzing of radar, lidar, or even audio data, depending on the nature of the sensors 91, 92, 93. These algorithms are well known and are not detailed further here. They allow events to come to be detected characterized by data coming from the unmonitored area Z'. The important point is that the data are analyzed according to the unmonitored area Z' and have not therefore been observed by the driver C of the vehicle V. The same is true for the potential data received by the vehicle, if the device DVC includes a means allowing it to be acquired.

The activation of the sensors 91, 92, 93 relating to the unmonitored area Z' allows it to be guaranteed that a potential alert comes from an unmonitored area and will not therefore erroneously draw the attention of the driver C and also allows the power consumption of the sensors 91, 92, 93 to be minimized.

The trigger module 104 will implement the step S4 for rendering or not to the driver C information representative of an alert depending on the result of the data analysis step S3.

The step S4 is that which allows the alerting method to achieve the desired improvement in safety at low cost since, by virtue of the method, information representative of an alert is rendered to the driver C relating to an event to come which may be deduced based on data coming from sensors 91, 92, 93 acquiring data in the unmonitored area Z'. This rendering may go as far as triggering an alarm. The information rendered during the step S4 is therefore relevant because it does not relate to the monitoring area Z determined in the present example that the driver C of the vehicle V is monitoring.

Moreover, the information rendered or not during the step S4 is intended for the driver C. This is not therefore a question of a direct action on the driving mechanisms of the vehicle V. Such a direct action would assume an integration between the decision mechanisms such as the onboard computer of the vehicle V or the device DVC and the driving mechanisms (steering, acceleration, braking) of the vehicle V. This direct integration would involve a significant modification, at a high cost, of the existing non-autonomous vehicles V, whereas the potential addition of sensors 91, 92, 93 and of the device DVC in order to benefit from the alerting method and from the concomitant improvement in safety is low cost. The present method however also operates in the presence of such devices originally integrated into the vehicle V, if the latter have been disabled by the driver C or anyone else.

In one embodiment, the step S3 for detecting events to come is completed by a categorization of the events detected, and information representative of an alert is rendered during the step S4 in the case where an event is imminent depending on its category.

In this embodiment, predefined scenarios of dangerous driving situations are initially defined and used by the alerting method. The use of such scenarios is well known by those skilled in the art in the field of autonomous driving. A scenario depends on the localization of the vehicle V within the road network. For example, one scenario may be the overtaking by the vehicle V of another vehicle on an expressway or freeway and the arrival of a third faster vehicle at the rear of the vehicle V which changes lane in order to perform its overtaking maneuver. Another scenario may be the stopping of the vehicle V at a road junction where the stop is obligatory ("STOP" junction) and the arrival of another vehicle at high speed on the higher priority road.

The existence of predefined scenarios allows the events detected during the data analysis step S3 to be categorized by verifying whether these events correspond to such scenarios. For example, the detection of a third-party vehicle approaching the vehicle V will be categorized differently if the vehicle V is stopped at a "STOP" junction and the third-party vehicle is traveling on the higher priority road than if the vehicle V is on a higher priority road and the third-party vehicle arrives on a lower priority road.

In this embodiment, the module 104 will therefore go as far as triggering an alarm or not during the step S4 depending on the category of the event detected during the step S3, and depending on how imminent it is.

The time for triggering of the alarm according to an aspect of the disclosure depends furthermore on the attention level of the driver C. It is indeed known that the reaction time of a driver is faster the higher is his/her attention level, and vice versa. In which case, the time corresponding to the imminence of the occurrence of an alert will be increased when the level of alertness determined is low, and hence the alert will need to be triggered earlier in order to take this increase in the reaction time of the driver C into account.

Generally speaking, in an aspect of the disclosure, during the step S4, information representative of an alert is rendered by the module 104 so as to encourage the driver C to have an appropriate driving reaction when faced with the event to come detected during the step S3 by analysis of the data captured by the sensors 91, 92, 93 relating to the unmonitored area Z'. This rendering of information may consist in triggering an alarm. A simple audio alarm, a significant alarm sound emitted in the driver compartment will encourage the driver C to reconsider information on his/her environment, to raise his/her attention level, and to take precautionary driving actions, such as not starting off at a road junction, braking, or else deferring a change of lane. This may also be true with a simple visual alarm, such as turning on a fixed or blinking lamp, even without direction indication. It is also possible to envision a tactile stimulus, such as a vibration in the steering wheel of the driver C, or else a mixture of these various stimuli in order to encourage the driver C to have an appropriate driving reaction when faced with the event to come. An olfactory stimulus may also be envisioned which would indicate to the driver C that the current situation presents a danger.

More precisely, in one particular embodiment, the alarm triggered during the step S4 implemented by the module 104 consists of a stimulus attracting the attention of the driver C toward the unmonitored area Z' obtained during the step S2.

Here again, the stimulus may be an audio alarm. For example, an alarm sound may be emitted, but in a localized manner, in order to encourage the driver C to turn his/her attention toward a precise area. The audio alarm may also be a precise message indicating to the driver C toward which unmonitored area Z' he/she has to turn their attention.

A visual stimulus may advantageously be used. According to a first example, a lamp, flashing or otherwise, situated in the direction of the unmonitored area Z', will be able to attract the attention of the driver C toward the latter. It will also be possible to use a ramp of bulbs. The progressive illumination of the various bulbs will attract the attention of the driver toward an unmonitored area Z' according to a well-known effect, used for example to direct the passengers of an airplane in the case of an emergency evacuation.

It is also possible to use illuminated signals in the form of an arrow. The stimulus will then be activated in a monitoring area Z, determined in the present example, that the driver C is monitoring, so as to be sure that the arrow is visible indicating the direction where the attention of the driver C must be focused.

Once the attention of the driver C has been turned toward the unmonitored area Z', the driver C will have an appropriate driving reaction in the face of the event to come detected during the step S3 for analyzing data captured by the sensors 91, 92, 93.

However, the reaction time of the driver C is increased by the reaction time needed to turn his/her attention from one monitoring area Z toward another.

According to another embodiment, the stimulus is of the illuminated type and is activated within the monitoring area Z toward which the gaze of the driver C is focused when the information representative of an alert is rendered.

The rendering of this information representative of an alert during the step S4 by a visual stimulus is aimed at allowing the driver C to have an appropriate driving reaction, and to do this without having to turn his/her attention to another area, which would require a complementary reaction time.

In one embodiment, the device rendering the information by a visual stimulus may use several colors, such as a diode traffic light display with the same colors as the road traffic lights. Such a device will allow the driver C concentrating his/her attention in one direction to be aware of an absence of danger on the unmonitored areas Z' by a green signal, and hence to take decisions in complete confidence with regard to the monitoring area Z, of a non-imminent potential hazard by an orange signal and of an imminent danger on the unmonitored area Z' by a red signal.

Thus, for example, a driver C of a vehicle V arriving at a road junction and looking right would be informed of an absence of danger coming from the left (green signal), of a potential hazard in a few seconds if he/she takes too long to react (orange signal) or of an imminent danger and without having to turn his/her attention to the left. This type of onboard device DVC may be considered as equivalent to mirrors positioned at certain road junctions with reduced visibility, which, by looking in a single direction and without having to turn the head, which takes too long for maneuvering in complete safety, allow the dangers coming from another direction to be seen.

According to one embodiment, several illuminating devices of this type are arranged in the passenger compartment in such a manner that one of them is always visible by the driver C irrespective of the direction of his/her gaze. In this configuration, when the driver C changes the direction of his/her gaze, the illuminating device positioned in the previous direction of the gaze of the driver C is extinguished and at least one of the illuminating devices now visible by the driver C is switched on with the illumination code previously shown.

Figure 2:
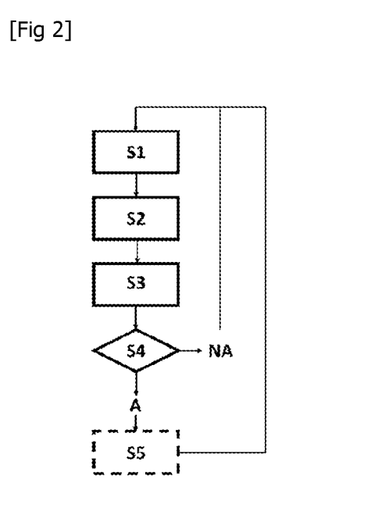
FIG. 2 illustrates one example of steps implemented in the framework of an aspect of the disclosure.

As regards FIG. 2, this illustrates one example of steps implemented in the framework of one embodiment of the disclosure.

As previously seen, the method according to an aspect of the disclosure begins, in the present example, with a step S1 for determining a monitoring area Z that the driver C is monitoring. The method continues with a step S2 for obtaining an area Z' not monitored by the driver C and for activating sensors 91, 92, 93 of the vehicle V, V' relating to the unmonitored area Z'. The method continues with a step S3 for analyzing data captured by the sensors 91, 92, 93 relating to the unmonitored area Z' in order to detect an event to come.

The following step is a step for rendering S4 or not to the driver C information representative of an alert depending on the result of the analysis step S3. In FIG. 2, the step S4 is therefore represented by a choice between two alternatives for rendering or not information representative of an alert.

The branch NA is the alternative in which information representative of an alert is not rendered. In this case, the method continues with a return to the determination step S1 present in this example.

In the branch A, information is rendered according to one embodiment discussed hereinabove.

In one embodiment, the vehicle V' is connected to a communications network N and the method comprises an additional step S5 for transmission of information representative of an alert via the communications network N intended for connected vehicles concerned by the event. In FIG. 2, this step S5 is indicated in a dashed rectangle so as to indicate that this step is only applicable for a vehicle V' connected to a communications network N.

The transmission step S5 may be carried out in two ways. The vehicle V' connected to a communications network N may address the information representative of an alert to a supervising server S, not shown in the figures. The latter holds a list of GPS-localized connected vehicles. The supervising server S may then address the information to the connected vehicles near to the connected vehicle N, because the information that the driver C of the vehicle V' is not monitoring the area Z' may be relevant information for a nearby connected vehicle. This connected vehicle may have capacities for autonomous driving, and in this case, the information transmitted could for example correspond to an autonomous driving action, such as a reduction in the speed. Otherwise, the information may be transmitted to the driver of this connected vehicle.

In another embodiment, the vehicle V' connected to a communications network N will directly address the information representative of the alert to nearby connected vehicles according to a broadcast model. This type of transmission of the alert by broadcast is well known to those skilled in the art, using for example V2X (acronym for vehicle-to-everything) technology, and is not further developed.

Figure 3:
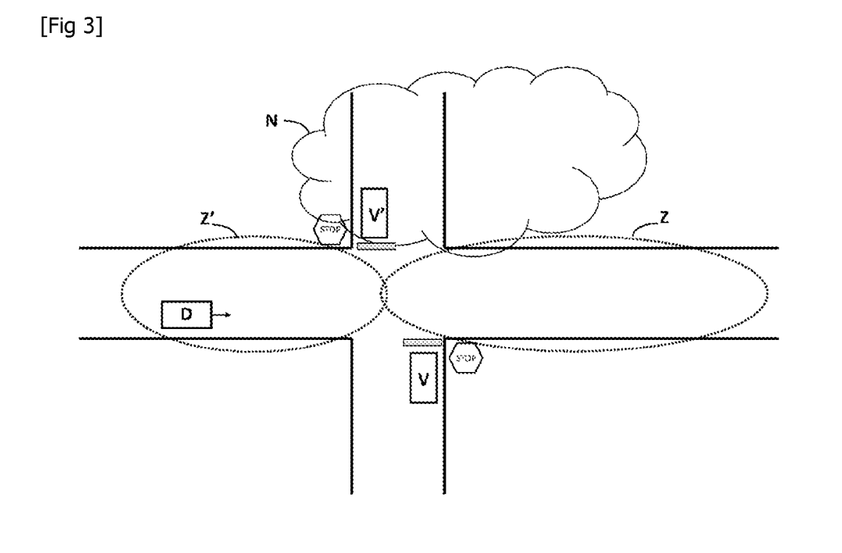
FIG. 3 illustrates a situation for implementation of an aspect of the disclosure at a road junction.

As regards FIG. 3, this illustrates a situation for implementation of an aspect of the disclosure at a crossroads.

This crossroads is a STOP junction, as indicated by the two representations of road signs indicated in the figure, and also by the two solid stripes painted on the road, also indicated in the figure. Two vehicles V, V' are stopped at this STOP junction. The vehicle V' is connected to a communications network N, which is not the case of the vehicle V.

In the present example, the step S1 has determined a monitoring area Z that the driver C of the vehicle V is monitoring. The step S2 has subsequently obtained an area Z' not monitored by the driver C of the vehicle, and, consequently, sensors 91, 92, 93, not shown in FIG. 3, relating to the unmonitored area Z' have been activated. In other embodiments, the unmonitored area Z' is obtained directly without having to determine a monitoring area Z. The step S3 for analyzing data captured by the sensors 91, 92, 93 relating to the unmonitored area Z' will thus allow an event to come to be detected, namely the arrival at the junction of the vehicle D shown in FIG. 3, the arrow indicating its direction of travel. The step S4 for rendering information representative of an alert will therefore render information in this regard, which, in this situation, will go as far as triggering an alarm intended for the driver C of the vehicle V, for example by means of an audio or visual or other stimulus. The categorization of the event of arrival of the vehicle D at the junction will clearly place it in the category of the events presenting an imminent danger, in view of the non-monitoring of the area Z' by the driver C of the vehicle V.

If the areas Z and Z' correspond to the monitoring and unmonitored areas, respectively, for the driver of the vehicle V', the step S4 for rendering information representative of an alert may be completed, in one embodiment, by a step S5 for transmitting information representative of an alert via the communications network N intended for connected vehicles concerned by the event. For example, in the situation in FIG. 3, the vehicle D could be connected to the communications network N, and could receive information transmitted by the method from the vehicle V' which would indicate a loss of attention on the part of the driver of the vehicle V'. This transmitted information could then have a direct action on the driving, for example a decrease in the speed, if the vehicle D has capacities for autonomous driving, or else be rendered to the driver of the vehicle D in order to alert him/her to the situation.

It should lastly be pointed out here that, in the present text, the term "module" may just as easily correspond to a software component as to a hardware component or a set of hardware and software components, a software component itself corresponding to one or more computer programs or sub-programs or, more generally, to any element of a program able to implement a function or a set of functions such as described for the modules in question. In the same way, a hardware component corresponds to any element of a hardware assembly able to implement a function or a set of functions for the module in question (integrated circuit, smartcard, memory card, etc.).

What is claimed is:

1. A method for alerting a driver of an automobile vehicle, the method being implemented by a device and comprising:
   obtaining an area not monitored by the driver and activating sensors of the vehicle relating to the unmonitored area;
   analyzing data captured by the sensors relating to the unmonitored area in order to detect a given event; and
   rendering information representative of an alert in response to an event being detected during the analyzing.

2. The method for alerting the driver of an automobile vehicle as claimed in claim 1, comprising categorizing the event detected in a category and wherein the rendering information representative of the alert comprises rendering the information in response to the event being imminent depending on the category.

3. The method for alerting the driver of an automobile vehicle as claimed in claim 1, wherein the automobile vehicle is connected to a communications network, and the method comprises transmitting the information representative of the alert via the communications network to connected vehicles concerned by the event.

4. The method for alerting the driver of an automobile vehicle as claimed in claim 1, wherein the method comprises determining an area, referred to as monitoring area, that the driver is monitoring and the information rendered comprises a stimulus in the monitoring area indicating to the driver an alert or an absence of alert coming from the unmonitored area obtained.

5. The method for alerting the driver of an automobile vehicle as claimed in claim 1, wherein the information representative of the alert comprises a stimulus attracting attention of the driver toward the unmonitored area obtained.

6. The method for alerting the driver of an automobile vehicle as claimed in claim 1, wherein obtaining an unmonitored area takes into account an attention level of the driver, in such a manner that as the attention level becomes lower, the unmonitored area obtained becomes larger.

7. The method for alerting the driver of an automobile vehicle as claimed in claim 1, wherein the rendering information representative of the alert takes into account an attention level of the driver, in such a manner that as the attention level becomes lower, the information is rendered earlier.

8. A device for managing an alert to a driver of an automobile vehicle, wherein the device comprises:
   a processor; and
   a non-transitory computer readable medium comprising instructions stored thereon which when executed by the processor configure the device to:
   obtain an area not monitored by the driver and activate sensors of the vehicle relating to the unmonitored area;
   analyze data captured by the sensors relating to the unmonitored area in order to detect a given event; and
   render information representative of an alert in response to the event being detected.

9. A non-transitory computer readable data medium on which a computer program is recorded, comprising a sequence of instructions for implementing an alerting method when the instructions are loaded into and executed by a processor of a device, wherein the alerting method comprises:
   obtaining an area not monitored by a driver of an automobile vehicle;
   activating sensors of the vehicle relating to the unmonitored area;
   analyzing data captured by the sensors relating to the unmonitored area in order to detect a given event; and
   rendering information representative of an alert in response to the event being detected.

* * * * *